United States Patent

[11] 3,593,564

| [72] | Inventor | Thaddaus Kraus<br>Vaduz, Liechtenstein |
|---|---|---|
| [21] | Appl. No. | 791,674 |
| [22] | Filed | Jan. 16, 1969 |
| [45] | Patented | July 20, 1971 |
| [73] | Assignee | Balzers Patent- Und Beteiligungs Aktiengesellschaft<br>Balzers, Liechtenstein |
| [32] | Priority | Jan. 18, 1968 |
| [33] | | Switzerland |
| [31] | | 969/68 |

[54] METHOD AND APPARATUS FOR EXAMINING MATERIAL SAMPLES
4 Claims, 6 Drawing Figs.

[52] U.S. Cl. ................................................. 73/19, 73/15
[51] Int. Cl. .......................................... G01n 7/14, G01n 25/22
[50] Field of Search ........................................... 73/19, 15, 15.4, 15.6, 23.1, 16, 17, 23; 276/1, 15, 51; 165/14, 58, 77, 86, 32, 72

[56] References Cited
UNITED STATES PATENTS
| 1,739,295 | 12/1929 | Diebold | 236/1 |
|---|---|---|---|
| 3,055,206 | 9/1962 | Watson et al. | 73/19 X |
| 3,062,038 | 11/1962 | Ayers | 73/23.1 |

FOREIGN PATENTS
| 6,707,853 | 10/1968 | Netherlands | 73/19 |

*Primary Examiner*—Richard C. Queisser
*Assistant Examiner*—Ellis J. Koch
*Attorney*—McGlew and Toren ABSTRACT: In a method for examining material samples, wherein the sample is heated under vacuum and the amount of gas exchanged by the sample is determined as a function of temperature, the sample is enclosed in a vessel which is permeable to radiant heat. The temperature of the sample is regulated by effecting relative movement between the vessel and the heating chamber, as by dipping the vessel into a heating chamber, raising and lowering a heating bell with respect to the vessel, or swinging the vessel laterally into and out of a laterally opening heating chamber. The apparatus includes the vessel, the heating chamber, and the means for effecting relative movement between the vessel and the heating chamber, in addition to the known evacuating and measuring means.

INVENTOR.
THADDÄUS KRAUS by
McGlew & Toren
ATTORNEYS

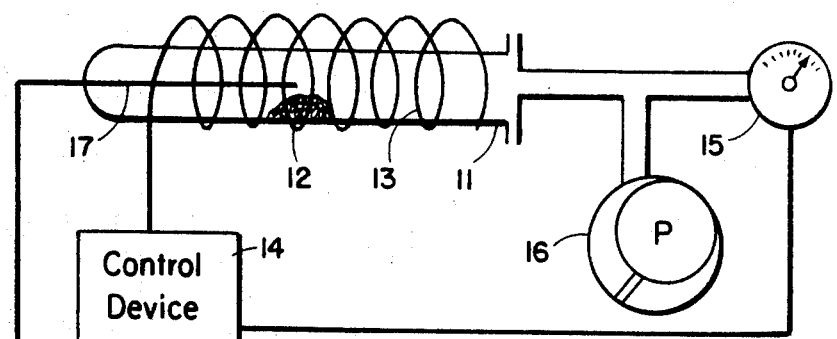
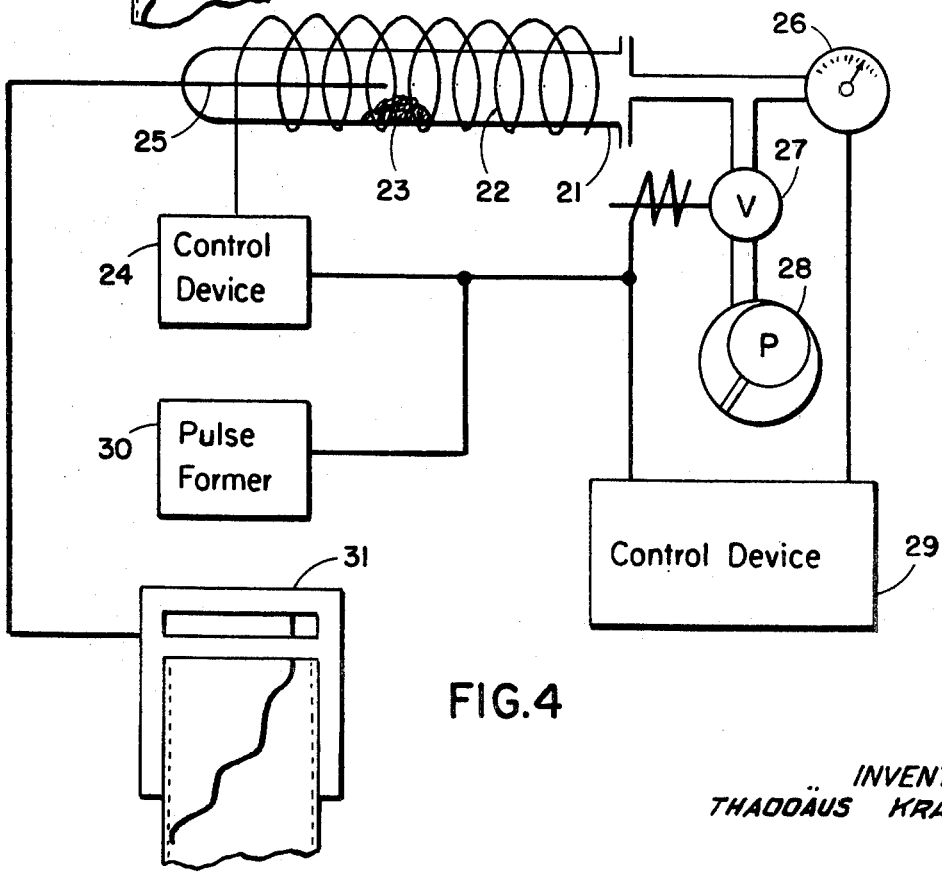
FIG.3
FIG.4
INVENTOR.
THADDÄUS KRAUS

12
METHOD AND APPARATUS FOR EXAMINING MATERIAL SAMPLES

BACKGROUND OF THE INVENTION

In a known method for examining material samples, the sample to be examined is heated under vacuum and under a certain pressure, and the amount of gas exchanged with the surrounding atmosphere, that is, either absorbed or given or by the sample, at varying temperatures, is determined. The method is based on the fact that such a sample does not absorb or give off gases, exchangeable by temperature variations, at a regular rate, but rather at certain temperatures within a relatively limited temperature range. It is therefore possible to determine the bonding state and the type of gas from the amounts of gas exchanged at measured temperatures.

A disadvantage of this method is that the exchange of gas depends also on the chronological course of the temperature variation, and this impairs the accuracy quite considerably. It has therefore been tried to use this method with only constant temperature variation of the sample (constant $\Delta T/\Delta t$). The results obtained were meaningful only if the rate of the temperature variation was indicated, for example in °C./sec. Results which were obtained with different rates of temperature variations could be compared with each other to only a limited extent.

In order to eliminate this disadvantage, it has been suggested, in Netherlands Pat. No. 6,707,853 to perform the method in such a manner that the amount of gas exchanged per unit of time is kept practically constant by corresponding adjustment of the sample temperature. In this procedure, the amount of gas exchanged per unit of time is used as a control quantity for adjusting the sample temperature, and known regulating devices can be used for this purpose. These regulating devices automatically vary the sample temperature in case of deviations of the gas exchange from the predetermined value, in such a manner as to restore the gas exchange to the predetermined value. The rate of temperature variation of the sample thus is not constant with this procedure, but the temperature curve is obtained rather as a function of the time. It was found that this function can be reproduced very accurately, and permits a better analytical solution than does the usual determination of the amount of gas exchanged as a function of time with a constant temperature rise of the sample.

This latter method is effected by controlling the temperature of an evacuable furnace housing, either to a specific temperature or by a so-called two-point control in which the temperature is maintained between relatively close upper and lower limits. Both arrangements provide for a sufficiently accurate constancy of the amount of exchanged gas.

Unfortunately, it has been found that the method of heating the sample in an evacuable furnace housing has a serious disadvantage that the time required for adjusting the temperature of the sample to the necessary nominal value, which is adjustable, is long, since, with each temperature variation, the furnace itself must be brought to the new temperature. The recording of the complete diagram of the gas delivery of a material sample is therefore time consuming and laborious.

SUMMARY OF THE INVENTION

This invention relates to the examination of material samples by heating the samples under a vacuum and determining the amount of gas exchanged with the atmosphere and, more particularly, to an improved method and apparatus for performing such testing of the type in which the amount of gas exchanged per unit of time is maintained substantially constant by corresponding adjustment of the sample temperature.

In accordance with the present invention, in the examination of material samples, the sample to be examined is heated under a vacuum and the amount of gas exchanged is determined as a function of the temperature. The sample is enclosed in a vessel which is preferably permeable to radiant heat, and the temperature is regulated by dipping the heat permeable vessel into a heating chamber.

Since the heater, having a relatively large heat capacity, does not have to change its temperature with the invention method, and, on the other hand, the vessel for the sample to be examined can be thin walled, as by being designed as a quartz tube of low heat capacity, a temperature regulation with very rapid temperature adjustment is possible.

Although furnaces where the sample enclosed in a vessel with a heat-permeable wall can be brought to different temperatures by varying the heat radiation are already known, no use is made of the possibility of realizing a rapid temperature variation which is independent, to a great extend, of the heat capacity of the furnace. An object of the invention is to provide an improved method of examining material samples by maintaining the amount of gas exchanged per unit of time substantially constant by corresponding adjustment of the sample temperature.

Another object of the invention is to provide an improved apparatus for performing the method.

A further object of the invention is to provide such a method and apparatus in which the sample is enclosed in a heat permeable vessel which is evacuated, and the temperature of the sample is regulated by effecting relative movement between the vessel and the heating chamber.

Yet another object of the invention is to provide such a method and apparatus in which the enclosing vessel is permeable to radiant heat.

A further object of the invention is to provide such a method and apparatus in which the vessel is moved into and out of a heating chamber either to an extend such as to maintain the temperature of the sample constant or at a frequency such that the mean temperature of the sample is maintained constant.

For an understanding of the principles of the invention, reference is made to the following description of typical embodiments thereof as illustrated in the accompanying drawings.

DESCRIPTION OF THE DRAWINGS

In the Drawings:

FIGS. 3 and 4 are schematic diagrams of apparatus suitable for performing the method whose results are graphically illustrated in FIG. 2;

DESCRIPTION OF THE PREFERRED EMBODIMENTS

In order to facilitate an understanding of the invention, the known prior art references mentioned above will be described more fully with particular reference to FIGS. 1, 2, 3 and 4.

Figure 1:
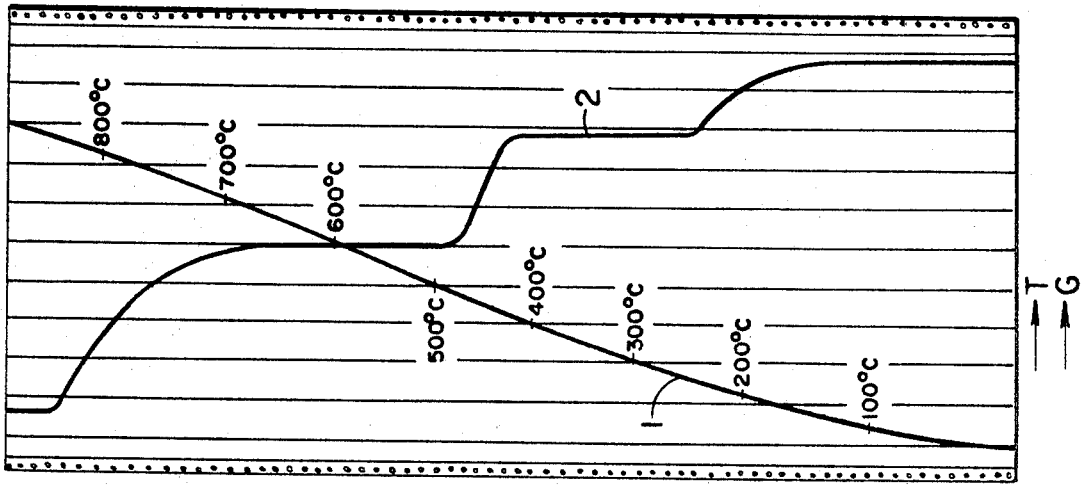

FIG. 1 illustrates, as a part of a recording tape, a so-called vacuum-thermogram, where the temperature of a calcium oxalate sample, weighing 146 mg., was increased very regularly and the amount of gas exchanged was determined as the weight loss of the sample (From: Neue Zurcher Zeitung, Technik Beilage, of 5/20/64). Curve 1 in FIG. 1 shows the course of the temperature $T$ and curve 2 shows the sample weight decreasing with rising furnace temperature as a function of the time $t$. It will be seen that at temperatures between 100° and 250° C., between 420° and 480° C., and between 600° and 840° C., certain decomposition processes take place in the sample. However, the respective decomposition temperatures cannot be determined very accurately, even in this well selected sample. In other cases, the above described method of vacuum thermography, which is the first method mentioned, leads even to less certain results.

Figure 2:
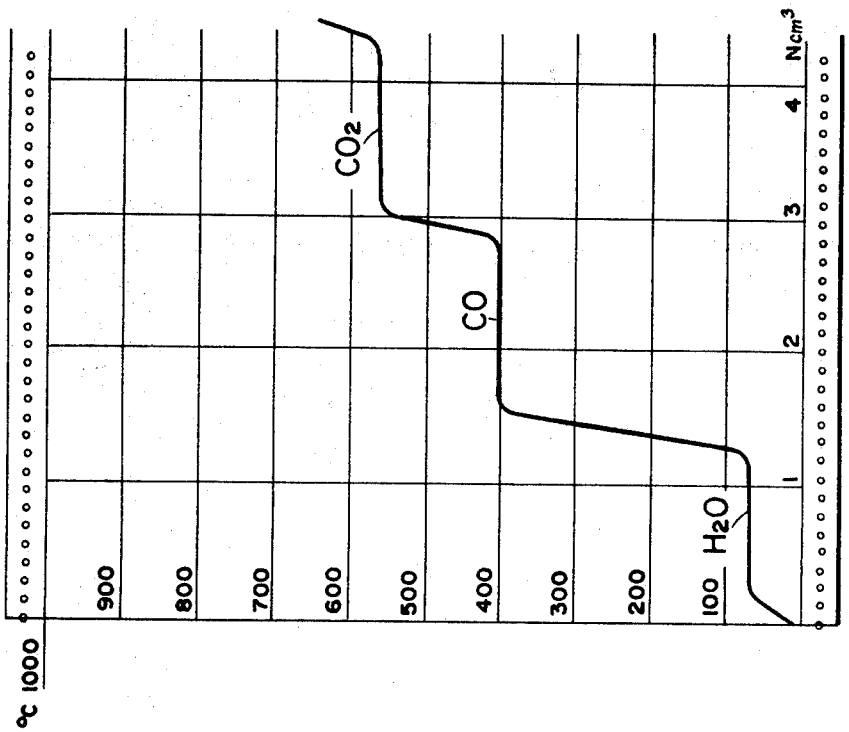
FIGS. 1 and 2 are graphical illustrations of the values obtained with known methods for examining material samples.

The second method mentioned, as disclosed in Netherlands Pat. No. 6,707,853, is illustrated in FIG. 2 which shows a vacuum thermogram which was obtained with a substantially constant gas exchange with respect to a calcium oxalate sample weighing only 9 mg. The decomposition temperatures appear, in FIG. 2, very pronounced. In addition, in this case, there is obtained, as a thorough examination had shown, values for the decomposition temperatures which are very close to the true values, as compared to the method involving a constant temperature rise and which yields temperature data that differ from the true values and which cannot be determined accurately, as will be clear from FIG. 1. In the sample graphically illustrated in FIG. 2, $H_2O$ was separated already at 90° C., CO at 400° C. and $CO_2$ at 560° C.

FIG. 3 illustrates schematically a simple arrangement for performing the method, the results of which are graphically illustrated in FIG. 2. An evacuated furnace chamber is illustrated at 11 as having the sample 12 positioned therein. Furnace chamber 11 and sample 12 therein can be heated by a heater 13 to temperatures which are determined by the heating filament power control device 14. Device 14 is connected with a pressure gauge 15 and controls the temperature of furnace chamber 11 so that the pressure in the latter, which depends on the amount of gas given off by sample 12 and on the a mount of gas pumped out by vacuum pump 16 for each unit of time, remains substantially constant. Since the feed from furnace chamber 11 to pump 16 has a certain gas conductance, a constant pressure means that the amount of gas pumped per unit of time, which is proportional to the pressure, is also constant.

As soon as pressure gauge 15 indicates a deviation from the nominal pressure value, the power supply to heating filament 13 is varied by control device 14 in such a manner as to be increased when the delivery of gas by the sample, and thus the pressure, decrease or be reduced when the delivery of gas by the sample and thus the pressure, increase. In this way, the pressure in furnace chamber 11 is regulated, with minor fluctuations to a preselected value. Since a constant gas delivery results from the practically constant temperature, as mentioned above, so that time represents a measure for the integral amount of gas given off by the sample from a certain instant on, the diagram of FIG. 2 can be obtained in a very simple manner by constantly measuring the varying furnace temperature with the electric thermometer 17 and recording it with the recorder 18. The time feed of recorder 18 then represents, at the same time, the coordinate for the integral amount of gas and can be calibrated, for example, in standard cubic centimeters (amount of gas converted in cc. at 0° C. and 760 mm. of Hg).

Another example of an arrangement by which the sample temperature can be recorded as a function of the integral amount of changed gas, that is starting from a certain measuring instant, is illustrated in FIG. 4. The furnace chamber 21, heating filament 22 for heating a sample 23 in furnace 21, heating filament power control device 24 and temperature measuring device 25 can be designed in the same manner as in the example of FIG. 3. The difference in FIG. 4 is that the amount of exchanged gas, that is, the amount of gas given off by the sample or, in the case of an absorbent sample, the amount of gas absorbed by the sample, is not determined simply by measuring the pressure in the furnace chamber. Instead, a special commercial gas meter is used for his purpose, and has a pressure gauge 26, an electromagnetic valve 27, a vacuum pump 28 and a control device 29. This gas meter, which is described in detail in German Pat. No. 1,145,815, operates in a manner such that an effective measuring chamber, in this case the furnace chamber with the connected measuring lines, is filled periodically with the gas to be measured to a certain pressure $p_1$ and is then evacuated to a predetermined pressure $p_2$, filled up again to the pressure $p_1$, etc. The amount of gas put through results from the number of measuring chamber fillings and the pressure difference $p_1 - p_2$.

In the present case, furnace chamber 21 serving as the measuring chamber, is filled in the case of a gas delivering sample, with the gas given off. As soon as this pressure $p_1$, indicated by pressure gauge 26, has been attained, valve 27 is opened and the gas withdrawn until the pressure drops to $p_2$. The valve 27 is then reclosed and the furnace chamber 21 is filled again with the measuring gas emanating from the sample. With each operation of valve 27, control device 29 transmits, at the same time, an electric pulse to a pulse former 30. Pulse former 30 has the function of emitting, for each incoming pulse whose duration and height can vary, a constant output pulse in order to actuate the paper feed of recorder 31. Since each operation of valve 27 corresponds to a certain amount of exchanged gas, the graphically illustrated furnace temperature is thus recorded in dependence on the amount of gas exchanged. If the amount of gas that can be absorbed by a sample in the furnace chamber is to be determined, a source of absorbable gas is connected instead of the pump 16 or 28. In this case, the heating filament power control device 24 must operate to increase the furnace temperature if the pressure drops, due to an excessive absorption rate, or to reduce the temperature if the pressure rises, due to insufficient absorption.

Figure 5:
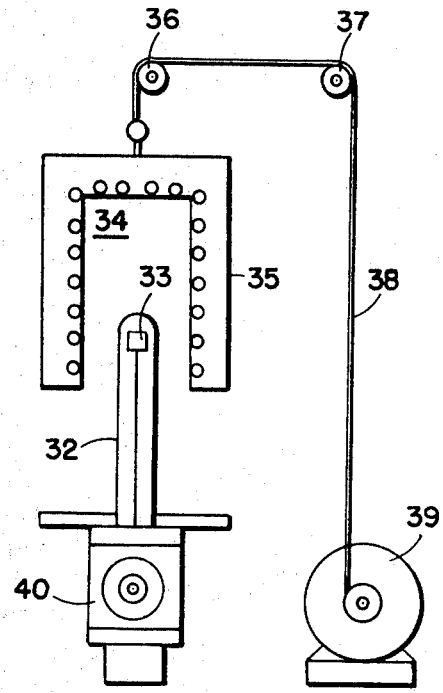
FIG. 5 is a somewhat schematic elevation view of one form of apparatus for performing the method of the invention.
Figure 6:
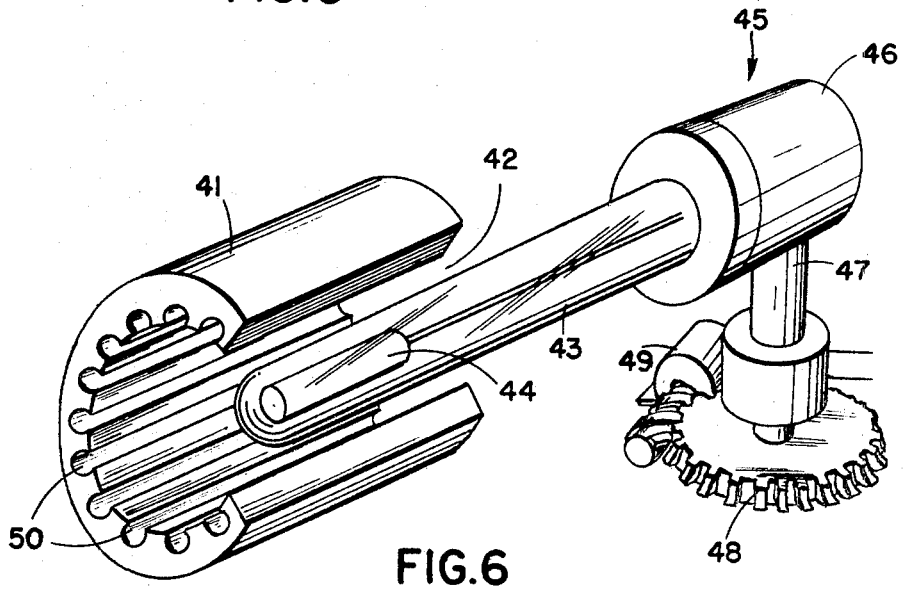
FIG. 6 is a perspective view of another form of apparatus for performing the method of the invention.

As previously mentioned, a sufficiently accurate constancy of the amount of exchanged gas can also be obtained using only a so-called two-point control, where the control quantity is kept within an upper limit and a lower limit. Also, and as previously mentioned, the just described method of heating in an evacuable furnace housing has the serious disadvantage that the time required for adjusting the temperature of the sample to the desired value is long since, with each temperature variation, the furnace itself must be brought to the new temperature. FIGS. 5 and 6 illustrate, by way of example, apparatus for carrying out the method of the present invention and which avoid these difficulties.

Referring to FIG. 5, a vessel 32 of quartz glass for containing a material sample 33, is schematically illustrated. The temperature of sample 33 can be so regulated by inserting vessel 32 into a greater or less depth into the interior 34 of a resistence heating bell 35, or by controlling the frequency of dipping vessel 32 into bell 35, that the gas exchange of the sample, during the examination, remains nearly constant with respect to time. For this purpose, heating bell 35 can be raised and lowered by means of a supporting cable 38 trained over pulleys 36 and 37. The position of heating bell 35, relative to sample container 32, as required for a certain sample temperature, is adjusted automatically by adjusting motor 39 in dependence on the amount of gas given off by the sample, The connection for a vacuum pump for evacuating vessel 32 is illustrated at 40.

FIG. 6 illustrates another apparatus for performing the method of the invention. Referring to FIG. 6, a hollow heater which is heat insulated with respect to its exterior, is illustrated at 41 and has a cylindrical wall which is open on one side, as at 42. By virtue of the opening 42, the vessel 43 containing the sample 44 can be swung into and out of the interior of heater 41, to a greater or lesser extent, or at a preselected frequency, all dependent on the desired temperature of the sample. The pivotal movement of the vessel 43 is effected by a driving mechanism generally indicated at 45 as having a swivel head 46 on a shaft 47 connected to a worm gear 48 which is driven by a worm operated by an adjusting motor 49. As indicated at 50, grooves are provided in the heat insulating material of furnace 41 to receive heating rods or wires.

With the arrangement shown in FIGS. 5 and 6, the method of vacuum thermography can be effected in a manner similar to that described in connection with FIG. 3.

I claim:

1. In apparatus for examining material samples, of the type including a vessel for receiving the sample and maintaining the sample under vacuum, heating means cooperable with said vessel to heat the sample, and means measuring the amount of gas exchanged by the sample as a function of the temperature of the sample; the improvement comprising, in combination, said vessel being formed of heat permeable material; and means mounting said vessel and said heating means for movement relative to each other to regulate the temperature of the sample; said heating means comprising a tubular heater having an opening extending along its cylindrical wall; said means mounting said heating means and said vessel for relative movement including a swivel support for said vessel and means operable to pivot said vessel into and out of said tubular heater through said opening in the cylindrical wall thereof.

2. In apparatus for examining material samples, the improvement claimed in claim 1, in which said vessel is constructed of radiant heat permeable material.

3. In apparatus for examining material samples, the improvement claimed in claim 1, in which said means mounting said heating means and said vessel for relative movement operate to immerse said vessel in said heating means to a depth corresponding to the desired temperature of the sample.

4. In apparatus for examining material samples, the improvement claimed in claim 1, in which said means mounting said heating means and said vessel for relative movement operate to cyclically immerse said vessel in said heating means at a rate sufficient to maintain the mean temperature of the sample at a selected value.